US012620404B2

(12) United States Patent
Kadioglu et al.

(10) Patent No.: US 12,620,404 B2
(45) Date of Patent: May 5, 2026

(54) DEEP SOURCE SEPARATION ARCHITECTURE

(71) Applicants: Dolby Laboratories Licensing Corporation, San Francisco, CA (US); DOLBY INTERNATIONAL AB, Amsterdam (NL)

(72) Inventors: Berkan Kadioglu, Boston, MA (US); Michael Getty Horgan, Brewster, MA (US); Jordi Pons Puig, Catalunya (ES); Xiaoyu Liu, Dublin, CA (US)

(73) Assignees: Dolby Laboratories Licensing Corporation, San Francisco, CA (US); Dolby International AB, Dublin (IE)

( * ) Notice: Subject to any disclaimer, the term of this patent is extended or adjusted under 35 U.S.C. 154(b) by 442 days.

(21) Appl. No.: 17/770,177

(22) PCT Filed: Oct. 20, 2020

(86) PCT No.: PCT/US2020/056531
§ 371 (c)(1),
(2) Date: Apr. 19, 2022

(87) PCT Pub. No.: WO2021/081002
PCT Pub. Date: Apr. 29, 2021

(65) Prior Publication Data
US 2022/0406323 A1      Dec. 22, 2022

Related U.S. Application Data

(60) Provisional application No. 63/087,788, filed on Oct. 5, 2020, provisional application No. 62/957,870, filed on Jan. 7, 2020.

(30) Foreign Application Priority Data

Oct. 21, 2019    (ES) ................................... 201930932

(51) Int. Cl.
*G10L 21/0272* (2013.01)
*G06N 3/04* (2023.01)
(Continued)

(52) U.S. Cl.
CPC .............. *G10L 21/028* (2013.01); *G06N 3/04* (2013.01); *G10L 25/30* (2013.01)

(58) Field of Classification Search
CPC .............. G10L 21/0272; G10L 21/028; G10L 21/0308; G10L 25/30; G06N 3/04;
(Continued)

(56) References Cited

U.S. PATENT DOCUMENTS

| | | |
|---|---|---|
| 2017/0178666 A1 | 6/2017 | Yu |
| 2019/0043516 A1 | 2/2019 | Germain |

(Continued)

FOREIGN PATENT DOCUMENTS

| | | |
|---|---|---|
| CN | 102625946 A | 8/2012 |
| CN | 106847302 B | 4/2020 |

(Continued)

OTHER PUBLICATIONS

"Kernels (Filters) in convolutional neural networks", updated Jun. 28, 2024, downloaded Dec. 20, 2024, 12 Pages. https://www.geeksforgeeks.org/kernels-filters-in-convolutional-neural-network/?ref=ml_lbp (Year: 2024).*
(Continued)

*Primary Examiner* — Martin Lerner

(57) ABSTRACT
A speech separation server comprises a deep-learning encoder with nonlinear activation. The encoder is programmed to take a mixture audio waveform in the time domain, learn generalized patterns from the mixture audio waveform, and generate an encoded representation that effectively characterizes the mixture audio waveform for speech separation.

14 Claims, 10 Drawing Sheets

(51) Int. Cl.

| | |
|---|---|
| *G06N 3/0442* | (2023.01) |
| *G10L 21/028* | (2013.01) |
| *G10L 25/30* | (2013.01) |

(58) Field of Classification Search

CPC .... G06N 3/045; G06N 3/0455; G06N 3/0464; G06N 3/048; G06N 3/0442

USPC ................ 704/232, 233; 706/15, 22, 27, 30

See application file for complete search history.

(56) References Cited

U.S. PATENT DOCUMENTS

| | | | |
|---|---|---|---|
| 2019/0066713 A1 | 2/2019 | Mesgarani | |
| 2019/0130250 A1* | 5/2019 | Park | G06N 3/04 |
| 2019/0138898 A1* | 5/2019 | Song | G06N 3/08 |
| 2019/0236451 A1 | 8/2019 | Jaitly | |
| 2019/0266418 A1* | 8/2019 | Xu | G06V 10/82 |
| 2019/0318725 A1 | 10/2019 | Le Roux | |
| 2020/0043467 A1* | 2/2020 | Qian | G10L 25/30 |
| 2020/0043517 A1* | 2/2020 | Jansson | G10L 21/0272 |
| 2020/0043518 A1* | 2/2020 | Jansson | G10L 21/0272 |
| 2020/0175313 A1* | 6/2020 | Jang | G06N 3/048 |
| 2020/0395036 A1* | 12/2020 | Kameoka | G10L 25/30 |
| 2021/0174817 A1* | 6/2021 | Grauman | G10L 25/30 |
| 2021/0272573 A1* | 9/2021 | Yousefi | G10L 25/84 |
| 2023/0352040 A1* | 11/2023 | Lester | G10L 21/028 |
| 2025/0246196 A1* | 7/2025 | Lee | G10L 25/30 |

FOREIGN PATENT DOCUMENTS

| | | | | |
|---|---|---|---|---|
| CN | 107680611 B | | 6/2020 | |
| EP | 3716270 A1 * | | 9/2020 | G06N 3/044 |
| WO | WO-2020232180 A1 * | | 11/2020 | G06N 3/045 |

OTHER PUBLICATIONS

Stoller et al., "Wave-U-Net: A Multi-Scale Neural Network for End-to-End Audio Source Separation", Proceedings of the 19th International Society for Music Information Retrieval Conference (ISMIR 2018), Jun. 8, 2018, pp. 334 to 340. (Year: 2018).*

Alexandre Defossez et al: "Music Source Separation in the Waveform Domain", Nov. 27, 2019.

Hendrik Purwins et al: "Deep Learning for Audio Signal Processing", arxiv.org, Cornell University Library, 201 Olin Library Cornell University Ithaca, NY 14853, Apr. 30, 2019.

Kadioglu Berkan et al.: "An Empirical Study of Conv-Tasnet", ICASSP 2020—2020 IEEE International Conference on Acoustics, Speech and Signal Processing (ICASSP), IEEE, May 4, 2020 (May 4, 2020), pp. 7264-7268.

Luo Yi et al: Conv-TasNet: Surpassing Ideal Time-Frequency Magnitude Masking for Speech Separation IEEE/ACM Tran Sa Cti Ons on Audio, Speech, and Language Processing, vol. 27, No. 8, Aug. 1, 2019, pp. 1256-1266.

Pandey Ashutosh et al: "TCNN: Temporal Convolutional Neural Network for Real-time Speech Enhancement in the Time Domain", ICASSP 2019—2019 IEEE International Conference on Acoustics, Speech and Signal Processing (ICASSP), IEEE, May 12, 2019 (May 12, 2019), pp. 6875-6879.

* cited by examiner

Figure 8:
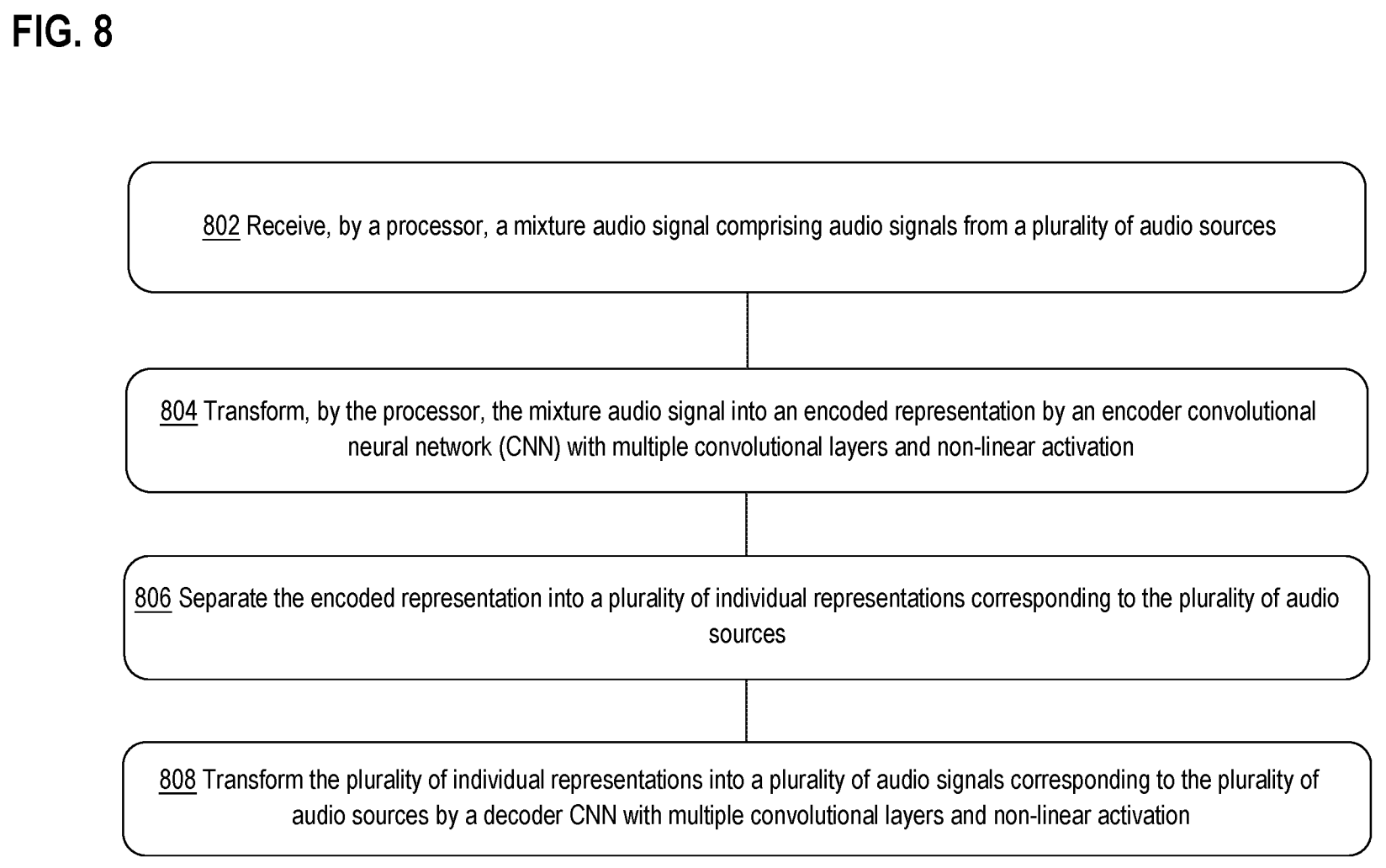

802 Receive, by a processor, a mixture audio signal comprising audio signals from a plurality of audio sources 804 Transform, by the processor, the mixture audio signal into an encoded representation by an encoder convolutional neural network (CNN) with multiple convolutional layers and non-linear activation 806 Separate the encoded representation into a plurality of individual representations corresponding to the plurality of audio sources 808 Transform the plurality of individual representations into a plurality of audio signals corresponding to the plurality of audio sources by a decoder CNN with multiple convolutional layers and non-linear activation

FIG. 9

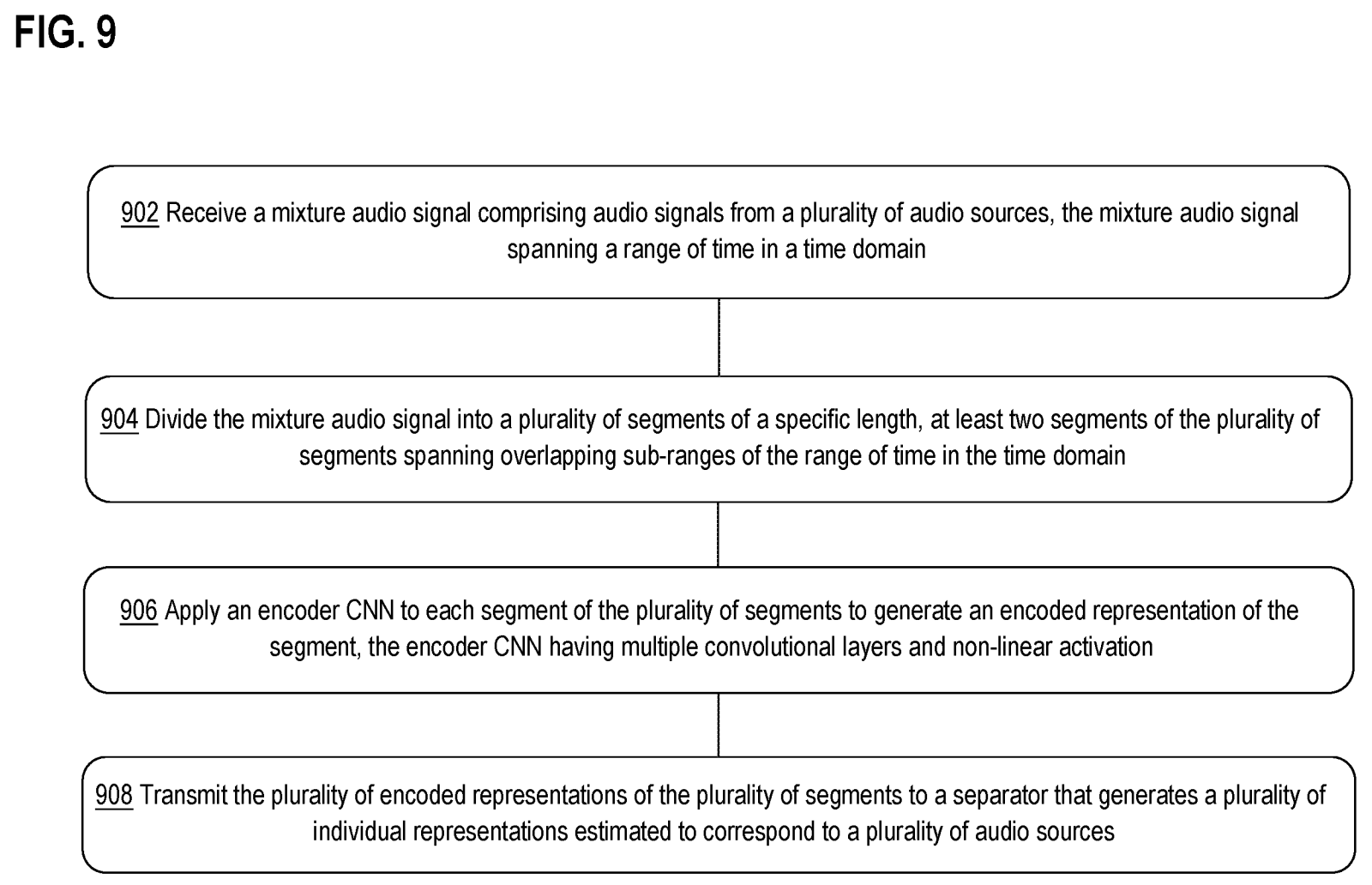

902 Receive a mixture audio signal comprising audio signals from a plurality of audio sources, the mixture audio signal spanning a range of time in a time domain 904 Divide the mixture audio signal into a plurality of segments of a specific length, at least two segments of the plurality of segments spanning overlapping sub-ranges of the range of time in the time domain 906 Apply an encoder CNN to each segment of the plurality of segments to generate an encoded representation of the segment, the encoder CNN having multiple convolutional layers and non-linear activation 908 Transmit the plurality of encoded representations of the plurality of segments to a separator that generates a plurality of individual representations estimated to correspond to a plurality of audio sources

FIG. 10

DEEP SOURCE SEPARATION ARCHITECTURE

CROSS-REFERENCE TO RELATED APPLICATIONS

This patent application claims priority to Spanish Patent Application No. P201930932 filed on Oct. 21, 2019, U.S. Provisional Patent Application No. 62/957,870 filed on Jan. 7, 2020 and U.S. Provisional Patent Application No. 63/087,788 filed on Oct. 5, 2020, each of which is incorporated by reference in its entirety.

TECHNICAL FIELD

The present Application relates to speech recognition and deep machine learning. More specifically, example embodiment(s) described below relate to improving neural network architecture for better separation of speech sources.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Identifying individual speech sources from mixture speech has been challenging. Learning from a large amount of data has led to some progress in such identification. It can be helpful to further utilize deep machine learning to improve the separation of speech sources.

BRIEF DESCRIPTION OF THE DRAWINGS

The example embodiment(s) of the present invention are illustrated by way of example, and not in way by limitation, in the figures of the accompanying drawings in which:

FIG. 2 illustrates the Conv-TasNet neural network.

FIG. 8 illustrates an example process performed with a speech separation server computer in accordance with some embodiments described herein.

FIG. 9 illustrates an example process performed with a speech separation server computer in accordance with some embodiments described herein.

FIG. 10 is a block diagram that illustrates a computer system upon which an embodiment of the invention may be implemented.

DESCRIPTION OF THE EXAMPLE EMBODIMENTS

Figure 1:
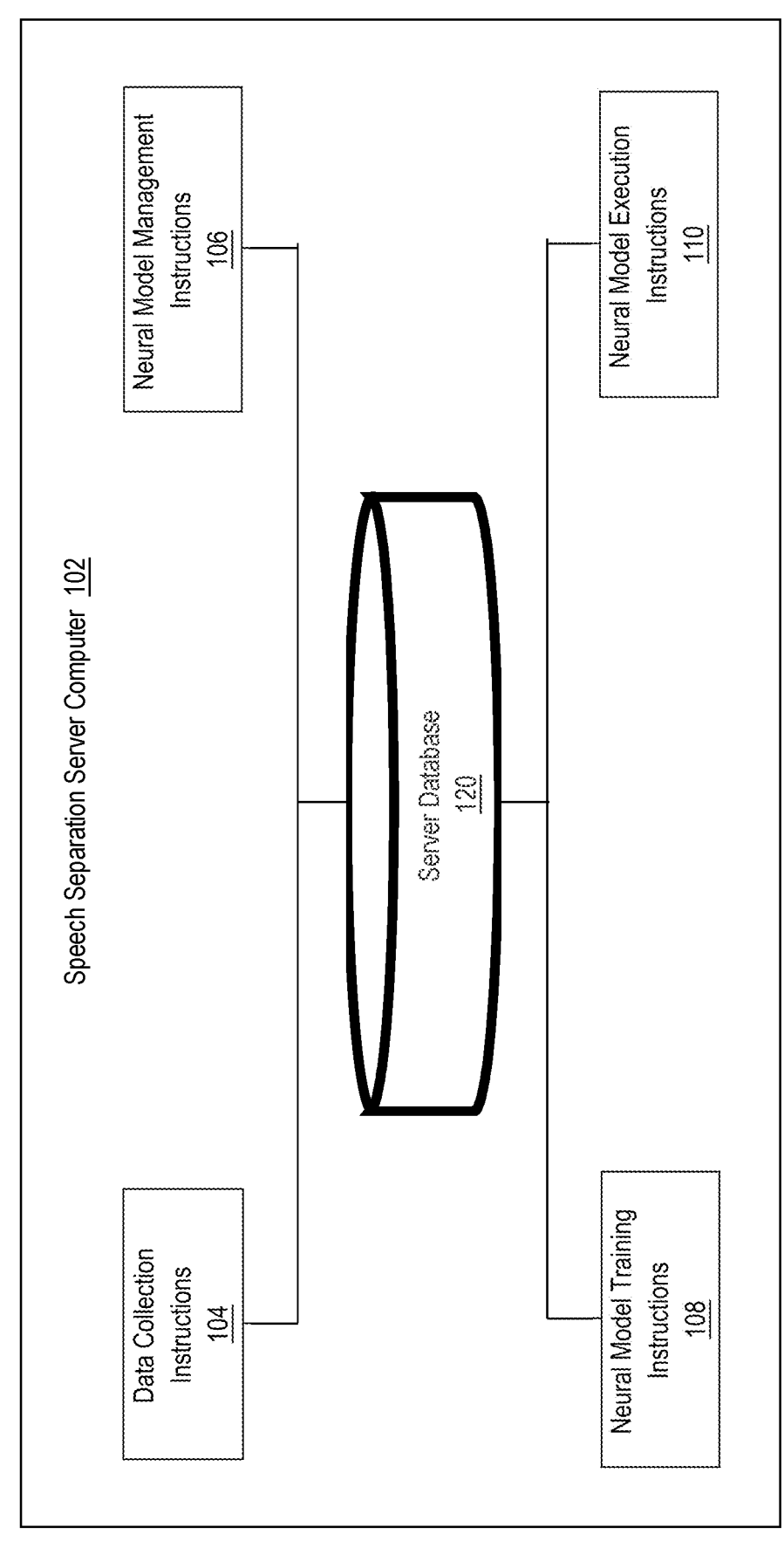
FIG. 1 illustrates example components of a speech separation server computer in accordance with the disclosed embodiments.

In the following description, for the purposes of explanation, numerous specific details are set forth in order to provide a thorough understanding of the example embodiment(s). It will be apparent, however, that the example embodiment(s) may be practiced without these specific details. In other instances, well-known structures and devices are shown in block diagram form in order to avoid unnecessarily obscuring the example embodiment(s).

Embodiments are described in sections below according to the following outline:

1. GENERAL OVERVIEW
2. EXAMPLE COMPUTER COMPONENTS
3. FUNCTIONAL DESCRIPTIONS
   3.1. CONV-TASNET
   3.2. DEEP, NONLINEAR ENCODER AND DECODER
      3.2.1.1. ARCHITECTURE
      3.2.1.2. TRAINING
4. EXAMPLE PROCESSES
5. EXPERIMENTAL RESULTS
6. HARDWARE IMPLEMENTATION
7. EXTENSIONS AND ALTERNATIVES

1. GENERAL OVERVIEW

A speech separation server computer ("server") and related methods are disclosed. In some embodiments, the server comprises a deep-learning encoder with nonlinear activation programmed to take a mixture audio waveform in the time domain, learn generalized patterns from the mixture audio waveform, and generate an encoded representation that effectively characterizes the mixture audio waveform for speech separation. The mixture audio waveform comprises utterances from multiple vocal sound sources over a period of time. The server also comprises a deep-learning decoder with nonlinear activation programmed to take an encoded representation of individual waveforms corresponding to separate speech sources, and generate the individual waveforms.

In some embodiments, the encoder is a convolutional network comprising multiple convolutional layers. At least one of the convolutional layers includes a one-dimensional (1-D) filter of a relatively small size. At least one of the convolutional layers includes a nonlinear activation function, such as a parametric rectified linear unit (PReLU) or a gated linear unit (GLU).

In some embodiments, the server is programmed to receive a mixture audio waveform spanning a time period in the time domain. For example, the mixture audio waveform could be the mixture of two utterances within ten minutes from two different speakers. The server is programmed to further generate, from the mixture audio waveform, waveform segments spanning overlapping time ranges within the time period. For example, four waveform segments can be derived from the ten-minute mixture audio waveform, each spanning ten milliseconds that overlaps with the time range of the previous waveform segment for two milliseconds.

In some embodiments, the server is programmed to run each of the waveform segments through the encoder to generate an encoded representation of the waveform segment.

In some embodiments, the server is programmed to apply a separator to the set of encoded representations to generate separate encoded representations, each spanning the time period and corresponding to a distinct speech source.

In some embodiments, the decoder is a convolutional network comprising multiple convolutional layers. At least one of the convolutional layers includes a 1-D filter of a relatively small size. At least one of the convolutional layers includes a nonlinear activation function, such as a PReLU or a GLU.

In some embodiments, the server is programmed to run each of the separate encoded representations to generate an individual waveform spanning the time period and corresponding to distinct speech source.

The server offers certain technical benefits. The architecture of combining small-context, nonlinear transformations for the encoder or the decoder enables learning of generalized patterns from the input mixture audio waveforms that better characterize individual constituent waveforms and thus enable better separation of speech sources. The small context allows efficient implementation even when a multitude of them are combined. The nonlinearity allows creation of complex mappings between inputs and outputs, which are beneficial for learning and modeling complex data.

2. EXAMPLE COMPUTER COMPONENTS

FIG. 1 illustrates example components of a speech separation server computer in accordance with the disclosed embodiments. The figure is for illustration purposes only, and the server 102 can comprise fewer or more functional or storage components. Each of the functional components can be implemented as software components, general or specific-purpose hardware components, firmware components, or any combination thereof. A storage component can be implemented using any of relational databases, object databases, flat file systems, or JavaScript Object Notation (JSON) stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the server 102 can comprise data collection instructions 104, neural model management instructions 106, neural model training instructions 108, and neural model execution instructions 110. In addition, the server 102 can comprise a server database 120.

In some embodiments, the data collection instructions 102 enable collection of training data, validation data, or actual data comprising mixture audio waveforms from which individual waveforms corresponding to different speech sources are to be identified. The training data and validation data, including both the mixture audio waveforms and the corresponding individual waveforms, can be retrieved from public data sources. The data collection instructions 102 further enable collection of various user preferences or system configurations related to the generation, processing, or use of the training data, validation data, or actual data.

In some embodiments, the neural model management instructions 106 enable management of different neural models, including storing or updating multiple convolutional neural networks having different structures. Each neural "model" in this context refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. The management of different neural models includes retrieving and storing system configurations or user preferences related to the training or execution of the neural models, such as the selection of the training algorithm or the objective function.

In some embodiments, the neural model training instructions 108 enable training or building of the different neural models. Based on the data obtained via the data collection instructions 104, and the relevant parameter values for the training process obtained via the neural model management instructions 106, the different neural models can be trained, and the results of the training, including values of various parameters of the neural models, can be stored for future use via the neural model management instructions 106.

In some embodiments, the neural model execution instructions 110 enable execution of the different neural models. Using the trained neural models obtained via the neural model training instructions 108 based on the relevant parameter values for the execution process obtained via the neural model management instructions 106, actual data of mixture audio waveforms can be separated into individual waveforms corresponding to different speech sources. The neural model execution instructions 110 further enable storing or transmitting the results of executing the neural models, such as the individual waveforms.

In some embodiments, the server database 120 is programmed or configured to manage storage of and access to relevant data, such as the training data, validation data, actual data, neural models, components of training procedures, system configurations, user preferences, or results of training or executing the neural models.

3. FUNCTIONAL DESCRIPTIONS

3.1 Conv-Tasnet

Recent publications have reported promising results from tackling source separation in the waveform domain. Conv-TasNet is an end-to-end neural network for speech source separation in the waveform domain, as described in Yi Luo and Nima Mesgarani, "Conv-TasNet: Surpassing Ideal Time—Frequency Magnitude Masking for Speech Separation," IEEE/ACM Transactions on Audio, Speech, and Language Processing, vol. 27, no. 8, pp. 1256-1266, 2019.

Figure 2:
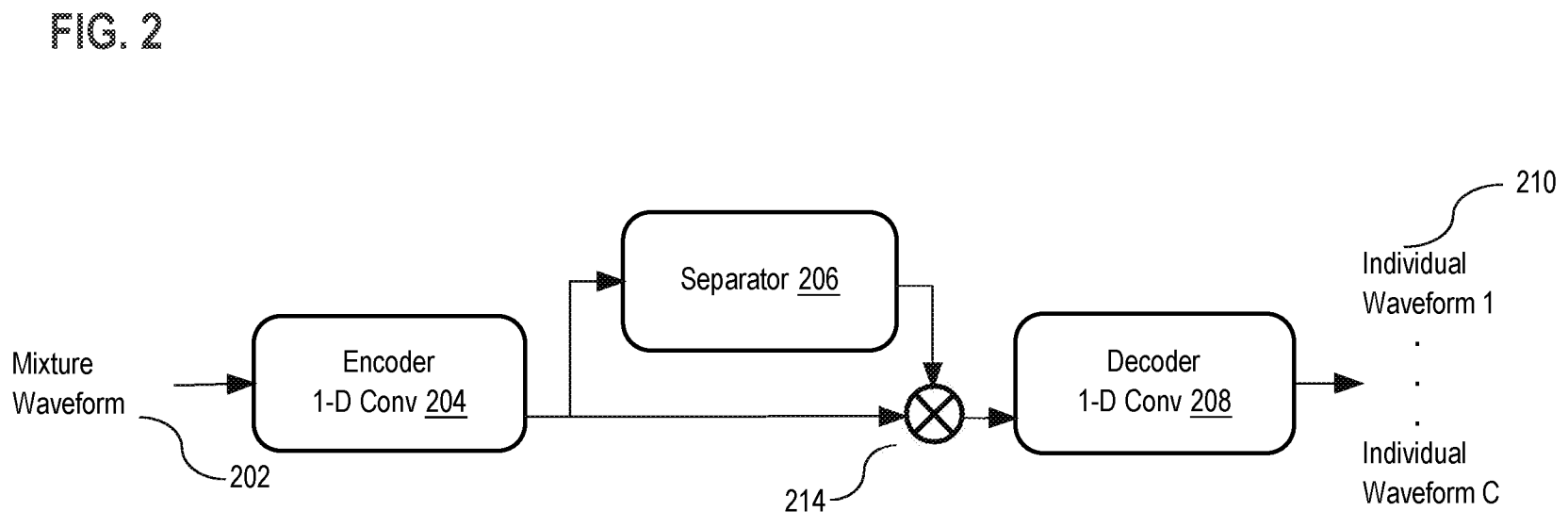

FIG. 2 illustrates the Conv-TasNet neural network. The Conv-TasNet neural network ("system" or "Conv-TasNet") comprises an encoder 204, a separator 206, and a decoder 208. The system is programmed to take a mixture audio waveform 202 as input and produces individual waveforms 210. Specifically, the system is programmed to separate C individual speech sources $s_c \in R^T$, where $c \in \{1, 2, \ldots, C\}$, from a single-channel mixture of speech $x \in R^T$, where T represents the length of the waveform and $$x = \sum_{c=1}^{C} s_c.$$

The encoder 204 linearly maps the mixture audio waveform 202 into a learned latent space. Specifically, the mixture audio waveform 202 is segmented into K overlapping frames $x_k \in R^L$, k=1, 2, . . . , K, each of length L with an overlap with S with the previous frame. Then, the linear transform is defined as:

$$E = UX, \quad (1)$$

where $U \in R^{N \times L}$ contains N learnable basis filters or kernels of size L in its rows, $X \in R^{L \times K}$ stores the K frames of length L in columns, and $E \in R^{N \times K}$ denotes the latent space representation of the mixture audio waveform 202, where each frame is represented by N values. This encoder can thus be implemented as a 1-D convolution with N kernels. In one example, N=512, L=16, and S=8, corresponding to 2 ms basis filters at a sample rate of 8 kHz, and 1 ms overlap.

The separator 206 predicts a representation for each speech source by learning a mask in this latent space. The separator 206 comprises stacked dilated convolutional blocks with exponentially increasing dilation factors, and each stack can be repeated multiple times. A deep stack of dilated convolutions enables the separator to have a large temporal context with a compact model size. The element-wise multiplication 214 then applies the individual masks produced by the separator 206 to the mixture audio waveform 202 to generate the individual latent space representations.

The decoder linearly transforms the latent space representation of each estimated clean source c=1, 2, . . . , C to the time domain:

$$\hat{S}_c = D_c^T V, \tag{2}$$

where $V \in R^{N \times L}$ contains N decoder basis filters (not tied with the encoder U), $D_c \in R^{N \times K}$ is the representation of the cth estimated source predicted by the separator, and $\hat{S}_c \in R^{K \times L}$ contains K frames of the reconstructed signal. The entire time domain waveform $\hat{s}_c$ is obtained by overlap-and-add of the rows of $\hat{S}_c$. Similar to the encoder, the decoder can be implemented as a 1-D (transposed) convolution. All the Conv-TasNet building blocks are jointly optimized.

3.2 Deep, Nonlinear Encoder and Decoder
3.2.1 Architecture

Figure 3:
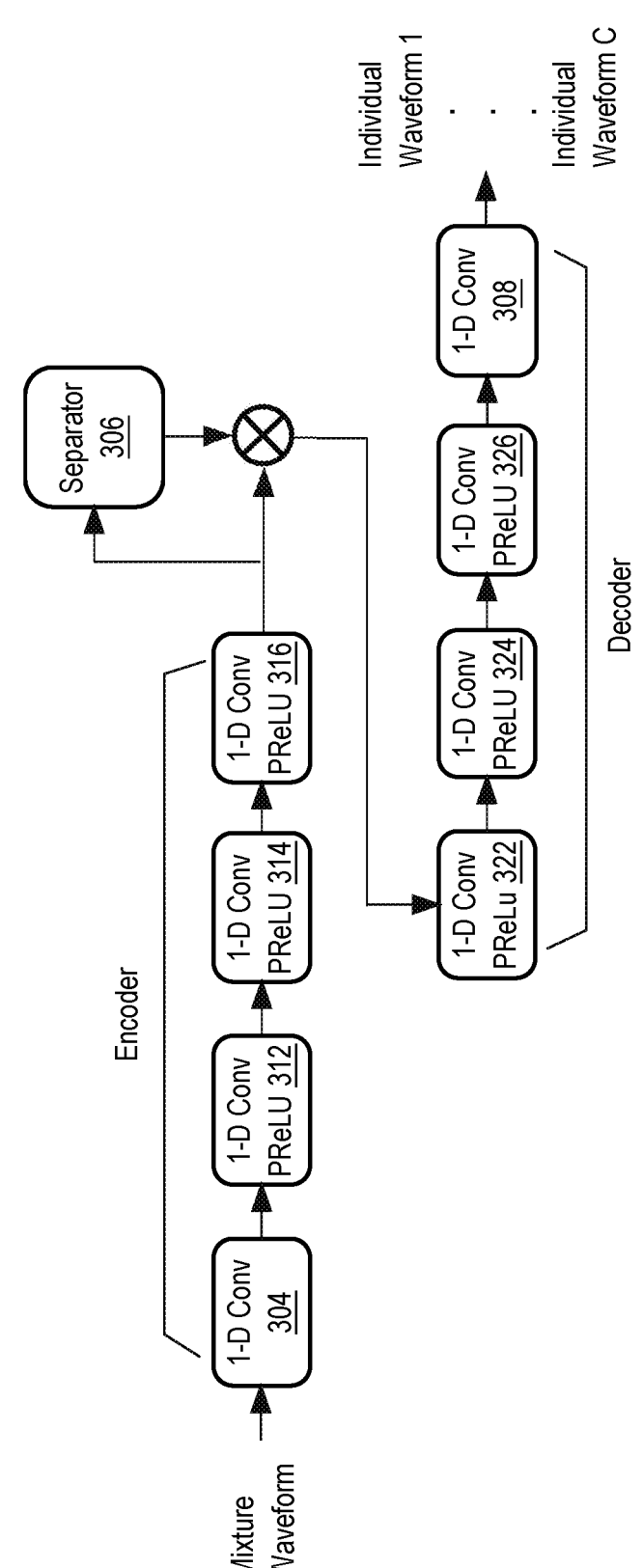
FIG. 3 illustrates an example neural network for speech separation in accordance with the disclosed embodiments.

FIG. 3 illustrates an example neural network for speech separation in accordance with the disclosed embodiments. In some embodiments, the neural network comprises an encoder and a decoder. The encoder or the decoder can be combined with the separator in Conv-TasNet to form an end-to-end neural network for speech separation or with another separator configured to receive the same types of input data and produce the same types of output data as the separator in Conv-TasNet, such as later improvements of Conv-TasNet.

In some embodiments, the encoder comprises a 1-D convolution 304, which can be identical or similar to the encoder 204 in Conv-TasNet, which receives a mixture audio waveform and produces the latent space representation of the mixture audio waveform. The 1-D convolution 304 is followed by a first stack of convolutional layers, such as convolutional layers 312, 314, and 316. Each convolutional layer comprises a 1-D convolution and a nonlinear activation function. For example, each convolutional layer may have a 1-D convolution followed by a PReLU, the PReLU being known to someone skilled in the art:

$$E_i = PReLU(U_i * E_{i-1}), \tag{3}$$

where * denotes the convolution operator, i=2, 3, . . . , I denotes the convolutional layer index, $U_i \in R^{N \times N \times g}$ denotes N learnable kernels, $E_1$ is the output of the 1-D convolution 304, and $E_i \in R^{N \times K}$ is output of the ith convolutional layer. As each $E_i$ denotes a latent space representation of the mixture audio waveform 202, where each frame is represented by N values, each kernel effectively has a size of N×g. The convolution with respect to the mixture audio waveform 202 continues over the time dimension. A stride of S can be used in the convolution. For example, the value of g can be 3, the value of S can be 1, and the size of the stack can be 3. This first stack of convolutional layers hierarchically transforms the mixture audio waveform 202 into a nonlinear latent space.

As the kernels in these convolutional layers have relatively small sizes for convolution in the time dimension, the initial convolutional layers extract more high-resolution or specific patterns in the mixture audio waveform 202, while the subsequent convolutional layers extract more low-resolution or abstract patterns. Such abstract, nonlinear latent representations allow the separator to make predictions in a space in which the salient components of the mixture are more easily distinguished and extracted. The small strides tend to improve the temporal resolution and can be combined with small kernel sizes to achieve good coverage. The controlled number of filters and size of the first stack (number of convolutional layers) then help achieve a good tradeoff between accuracy and speed. Compared to the convolutional blocks in the separator 206 in Conv-TasNet, for example, the structure of each convolutional layer and of the entire first stack of convolutional layers is relatively simple to help retain the performance advantage of the encoder, leaving more of the execution time to a separator module. Such deep learning to effectively and efficiently characterize the speech signals for speech separation is missing from prior encoders or decoders.

In some embodiments, the structure of the decoder mirrors the structure of the encoder. The predicted representations generated from the separator 306, which can be identical or similar to the separator 206 in Conv-TasNet, are first processed by a second stack of convolutional layers, such as convolutional layers 322, 324, and 326. Each convolutional layer comprises a dimension-preserving 1-D transposed convolution with a nonlinear activation function and otherwise operates in the same fashion as a convolutional layer in the encoder. The kernels in these convolutional layers of the decoder can be learned separately from the kernels in those convolutional layers of the encoder. Finally, the second stack of convolutional layers is followed by 1-D transposed convolution 308, which can be identical or similar to the decoder 308 in Conv-TasNet, to produce the time-domain estimated source signals.

Figure 4:
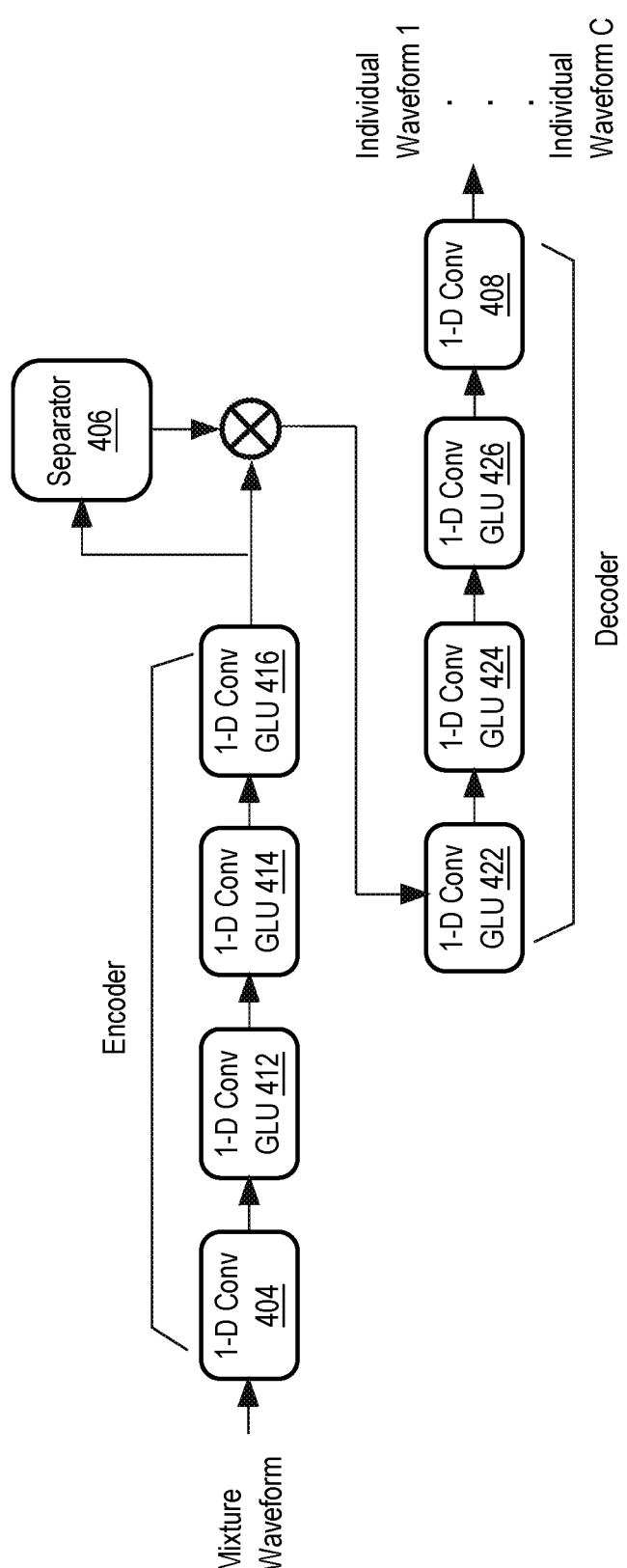
FIG. 4 illustrates an example neural network for speech separation in accordance with the disclosed embodiments.

FIG. 4 illustrates an example neural network for speech separation in accordance with the disclosed embodiments. In some embodiments, the neural network comprises an encoder and a decoder, similar to the neural network illustrated in FIG. 3. One difference is that a GLU known to someone skilled in the art or a modified GLU, as discussed below, is used in place of each PReLU. A GLU generally has many more learnable parameters than a PReLU. Similar to attention, a GLU relies on a learned gate to model the relative importance of the kernels. Therefore, the encoder comprises a 1-D convolution 404, which can be identical or similar to the encoder 204 in Conv-TasNet, followed by a first stack of convolutional layers, such as convolutional layers 412, 414, and 416. Each convolutional layer comprises a 1-D convolution and a nonlinear activation function, such as the GLU. The structure of the decoder mirrors the structure of the encoder. The predicted representations from the separator 406, which can be identical or similar to the separator 206 in Cony-TasNet, are first processed by a second stack of convolutional layers, such as 422, 424, and 426. Each convolutional layer comprises a dimension-preserving 1-D transposed convolution with a nonlinear activation function, such as the GLU. Finally, the second stack of convolutional layers is followed by 1-D transposed convolution 408, which is the decoder in Conv-TasNet.

Figure 5:
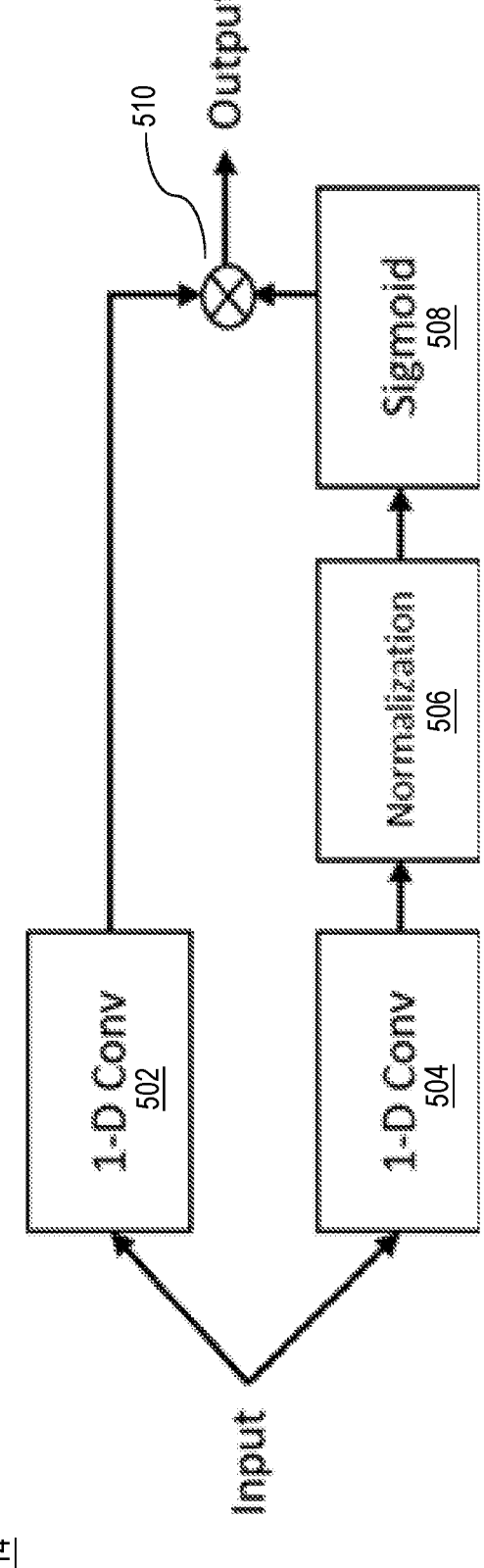
FIG. 5 illustrates an example convolutional layer having a modified gated linear unit in accordance with the disclosed embodiments.

FIG. 5 illustrates an example convolutional layer having a modified GLU in accordance with the disclosed embodiments. In some embodiments, the convolutional layer, such as 412 illustrated in FIG. 4, comprises a GLU, with a first pathway through the 1-D convolution 502 and a second pathway through the 1-D convolution 504 and the Sigmoid activation function 508 to fulfill the gating mechanism 510. The convolutional layer further comprises a global layer normalization 506 known to someone skilled in the art before the Sigmoid activation function 508 known to someone skilled in the art, forming a modified GLU, to speed up training.

In some embodiments, the number of convolutional layers having nonlinear activation included in a neural network for an encoder or decoder, such as the one illustrated in FIG. 3 or FIG. 4, can be fewer or more than three. In one embodiment, the nonlinear activation function included in the neural network can instead be a leaky Rectified Linear Unit (ReLU), a Sigmoid function, a Tan H function, a Gaussian error linear unit (GELU), a softplus function, an exponential linear unit (ELU), an arcTan function, a square nonlinearity function (SQNL), or other nonlinear activation functions known to someone skilled in the art. In one embodiment, multiple convolutional layers have different nonlinear activation functions. In one embodiment, every convolutional layer has nonlinear activation. In one embodiment, not every convolutional layer following the first convolutional layer, which has linear activation or no linear activation, has nonlinear activation.

Figure 6:
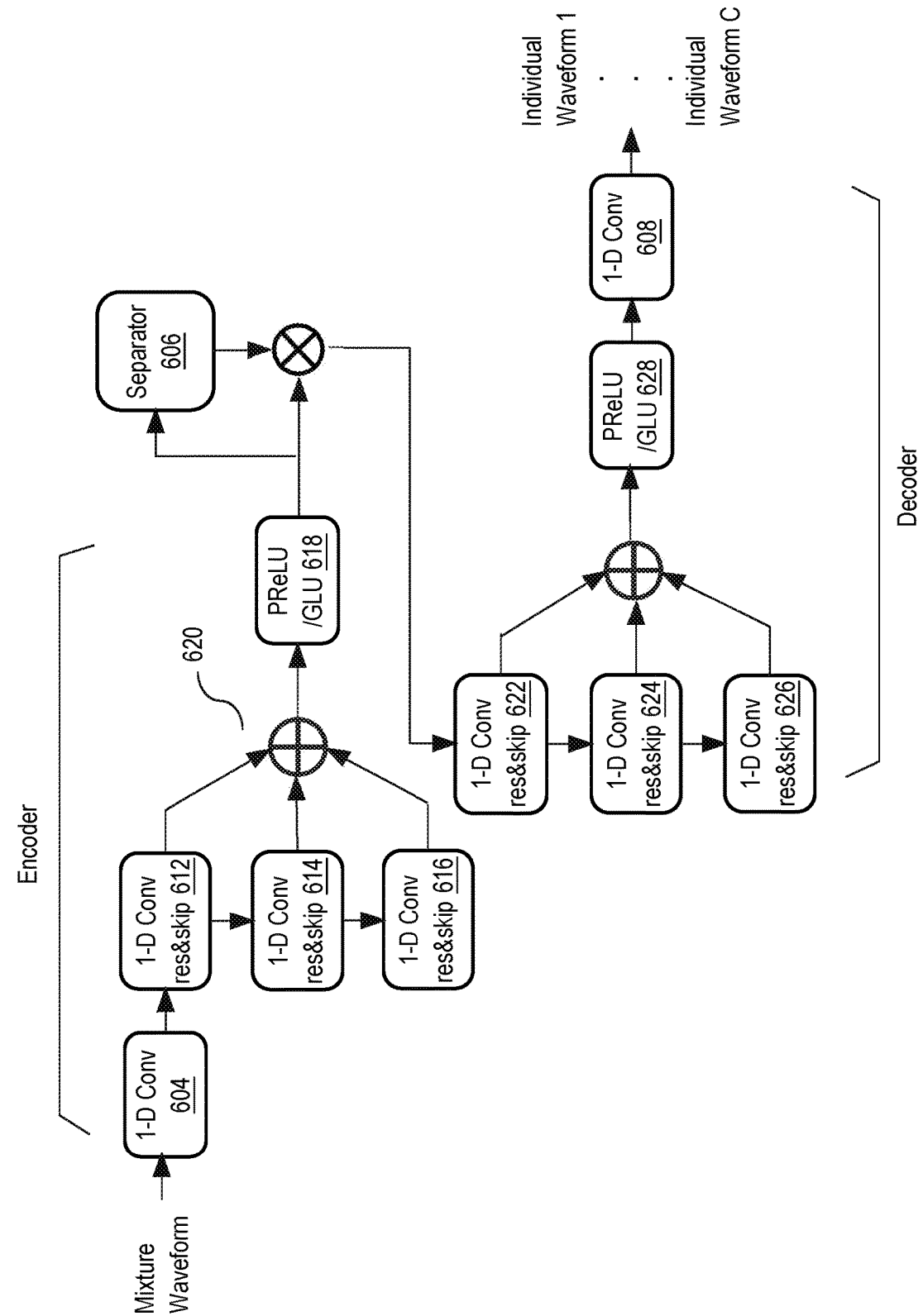
FIG. 6 illustrates an example neural network for speech separation in accordance with the disclosed embodiments.

FIG. 6 illustrates an example neural network for speech separation in accordance with the disclosed embodiments. In some embodiments, the neural network comprises an encoder and a decoder. The encoder comprises a 1-D convolution 604, which can be identical or similar to the encoder in Conv-TasNet. The 1-D convolution 604 is followed by a first stack of convolutional layers, such as 612, 614, and 616, regulated by a nonlinear unit, such as a PReLU or a GLU 618. Each convolutional layer in the encoder is set up with skip and residual connections, such skip and residual connections known to someone skilled in the art. Skip connections are known to avoid vanishing gradients or eliminate singularities in deep learning networks, making the learning process possible or easier. The residual connection leads to the next convolutional layer and the skip connection leads to a summation 620 feeding into the nonlinear unit 618. The structure of the decoder mirrors the structure of the encoder. The predicted representations from the separator 606, which can be identical or similar to the separator in Conv-TasNet, are first processed by a second stack of convolutional layers, such as 622, 624, and 626, regulated by a nonlinear unit 628. Each convolutional layer in the decoder is set up with skip and residual connections, as in the encoder. Finally, the second stack of convolutional layers is followed by 1-D transposed convolution 608, which can be identical or similar to the decoder 208 in Conv-TasNet.

Figure 7:
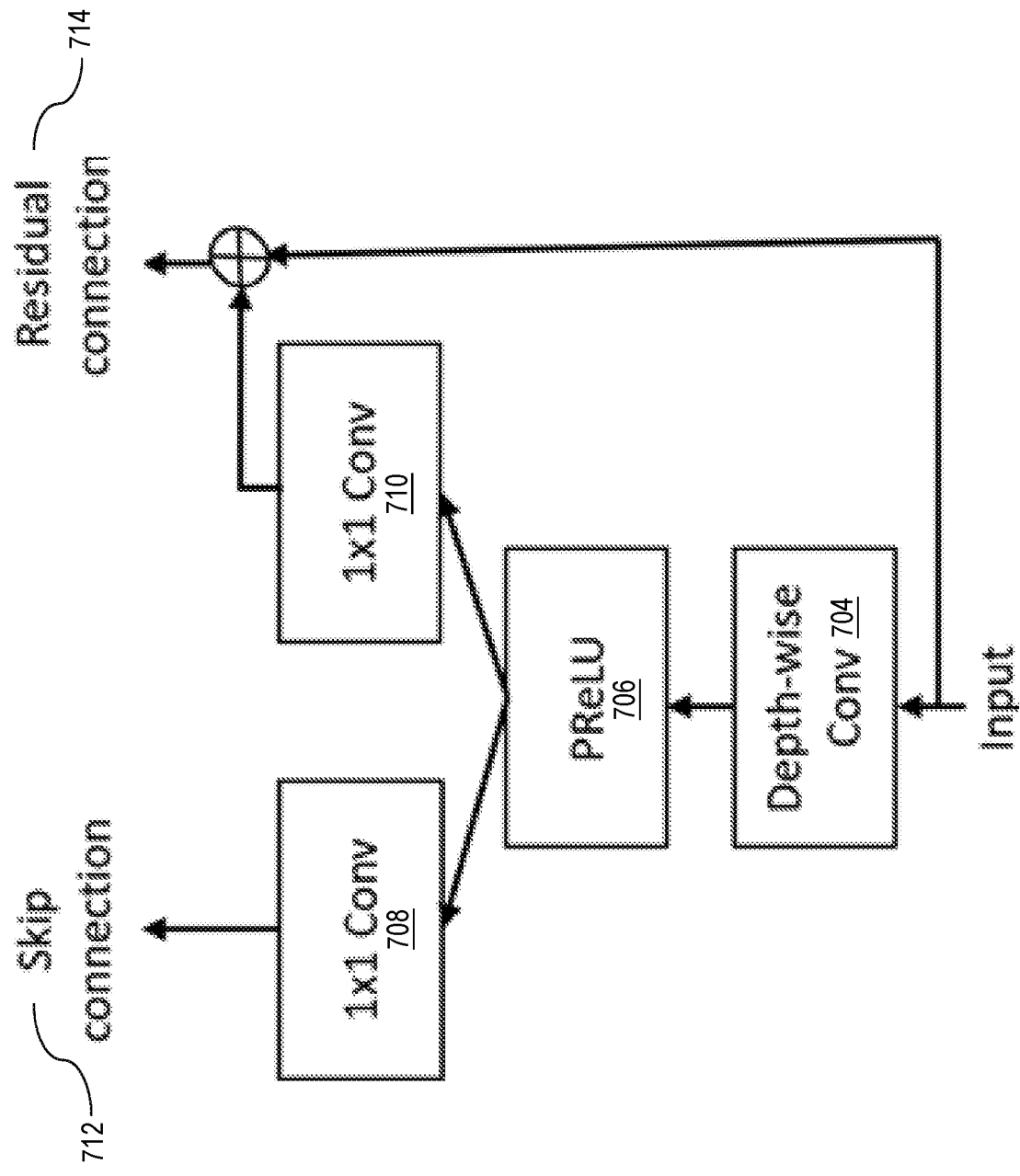
FIG. 7 illustrates an example convolutional layer having skip and residual connections in accordance with the disclosed embodiments.

FIG. 7 illustrates an example convolutional layer with skip and residual connections in accordance with the disclosed embodiments. In some embodiments, the convolutional layer, such as 612 illustrated in FIG. 6, comprises a depth-wise convolution 704, the depth-wise convolution or depth-wise separable convolution known to someone skilled in the art, followed by a nonlinear activation function 706, such as a PReLU. The depth-wise convolution 704 can have the same parameters as the 1-D convolutions discussed. For example, the kernel used in each convolution operation has a size of g. The nonlinear activation function 706 is then followed by a first path through a first point convolution 710, the point convolution known to someone skilled in the art for the residual connection 714 and a second path through the second point convolution 708 for the skip connection 712. In other embodiments, the PReLU 706 of the depth-wise convolution 704 may be replaced by another nonlinear activation function, such as a GLU or modified GLU illustrated in FIG. 5.

3.2.2 Training

In some embodiments, the encoder and the decoder are trained together with the separator. A procedure for such end-to-end training is described in the Conv-TasNet publication cited above. Instead of the scale-invariant signal-to-noise ratio (SI-SNR) applied in that procedure, the SI-SNR with a power-law term is used as the objective function. Specifically, in an effort to constrain the scale of the predicted sources (in terms of the amplitude of the waveforms) from the deep encoder or decoder, the SI-SNR objective function is augmented with a power-law term that encourages the model being trained to predict spectra that are of similar magnitude to the ground truth. Power laws are known to correlate with human perception. The augmented objective function is written as:

$$L = -SI\text{-}SNR(\hat{s}_c, s_c) + \beta \cdot P\text{-}law(\hat{s}_c, s_c, \alpha), \tag{4}$$

where $$P\text{-}law(x, y, \alpha) = L1\text{-norm}(\|STFT(x)\|^{\alpha} - \|STFT(y)\|^{\alpha}), \tag{5}.$$

$\hat{S}_c$ and $s_c$ are discussed above. STFT stands for short-time Fourier transform. $\alpha$ is a perceptual exponent that maps the raw signal energy in each time-frequency bin to a perceptual domain. $\alpha$ is meant to map the spectra to a domain in which human perception of loudness is more linear, e.g., doubling the value in this domain should double the perceived loudness of the signal. $\beta$ is a weighting factor that represents the weight of the P-law in the total loss. The value of $\alpha$ or $\beta$ is between 0 and 1. In certain embodiments, $\beta$ is set to 0.01 and $\alpha$ is set to 0.5.

In some embodiments, the training data spans a certain duration, such as 30 hours, and the validation data spans a certain duration, such as 10 hours. The training data or the validation data can be obtained from randomly mixing utterances from a number of speakers at randomly selected signal-to-noise ratios (SNRs). For example, the training data and the validation data can be generated from randomly mixing utterances from 100 speakers at randomly selected SNRs between −5 and 5 dB. The waveforms can be sampled at a certain frequency, such as 8,000 Hz.

4. EXAMPLE PROCESSES

FIG. 8 and FIG. 9 each illustrate an example process performed with a speech separation server computer in accordance with some embodiments described herein. FIG. 8 and FIG. 9 are each shown in simplified, schematic format for purposes of illustrating a clear example and other embodiments may include more, fewer, or different elements connected in various manners. FIG. 8 and FIG. 9 are each intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

Referring to FIG. 8, in some embodiments, in step 802, the server is programmed to receive a mixture audio signal comprising audio signals from a plurality of audio sources. Each of the plurality of audio signals can comprise a waveform in a time domain.

In some embodiments, in step 804, the server is programmed to transform the mixture audio signal into an encoded representation by an encoder convolutional neural network (CNN) with multiple convolutional layers and nonlinear activation.

In some embodiments, the encoder CNN comprises a convolutional layer with linear activation or no activation. In other embodiments, the encoder CNN comprises a convolutional layer with 1-D convolutional operation.

In some embodiments, the nonlinear activation comprises a PReLU, a GLU, a GLU with normalization, a leaky ReLU, a Sigmoid function, or a Tan H function. In other embodiments, the encoder CNN comprises three convolutional layers, each convolutional layer of the three convolutional layers having nonlinear activation.

In some embodiments, the encoder CNN comprises one or more convolutional layers with residual and skip connections. The encoder CNN can further comprise nonlinear activation following the one or more convolutional layers with residual and skip connections. In addition, a convolutional layer of the one or more convolutional layers can comprise one or more nonlinear activation functions.

In some embodiments, in step 806, the server is programmed to separate the encoded representation into a plurality of individual representations corresponding to the plurality of audio sources. The separating can be performed by a separator CNN comprising stacked dilated convolutional blocks.

In some embodiments, in step 808, the server is programmed to transform the plurality of individual representations into a plurality of audio signals corresponding to the plurality of audio sources by a decoder CNN with multiple convolutional layers and nonlinear activation. A structure of the decoder CNN can correspond to a structure of the encoder CNN.

In some embodiments, the server is programmed to receive a plurality of sample audio signals corresponding to the plurality of audio sources. The server is programmed to further build the encoder CNN from the plurality of sample audio signals using an objective function comprising SI-SNR with permutation-invariant training.

Referring to FIG. 9, in some embodiments, in step 902, the server is programmed to receive a mixture audio signal comprising audio signals from a plurality of audio sources, the mixture audio signal spanning a range of time in a time domain.

In some embodiments, in step 904, the server is programmed to divide the mixture audio signal into a plurality of segments of a specific length, at least two segments of the plurality of segments spanning overlapping sub-ranges of the range of time in the time domain.

In some embodiments, in step 906, the server is programmed to apply an encoder CNN to each segment of the plurality of segments to generate an encoded representation of the segment, the encoder CNN having multiple convolutional layers and nonlinear activation.

In some embodiments, the nonlinear activation comprises a PReLU, a GLU, a GLU with normalization, a leaky ReLU, a Sigmoid function, or a Tan H function. In other embodiments, the encoder CNN comprises three convolutional layers, each convolutional layer of the three convolutional layers having nonlinear activation. In yet other embodiments, the encoder CNN comprises one or more convolutional layers with residual and skip connections.

In some embodiments, in step 908, the server is programmed to transmit the plurality of encoded representations of the plurality of segments to a separator that generates a plurality of individual representations corresponding to the plurality of audio sources.

In some embodiments, the server is programmed to receive the plurality of individual representations from the separator. The server is further programmed to apply a decoder CNN to each individual representation of the plurality of individual representations to generate an audio signal that spans the range of time, the decoder CNN having multiple convolutional layers and nonlinear activation. The server is next programmed to transmit the plurality of audio signals.

5. EXPERIMENTAL RESULTS

Experiments were conducted using the exemplary nonlinear deep encoder/decoder with I number of layers. The first layer was equivalent to the original Conv-TasNet encoder, where a linear transformation was applied to frames of length L and stride S. It was implemented via a 1-D convolutional layer with N kernels. The first layer is followed by a stack of I-1 1-D convolutional layers, with each layer having N kernels of size N×3 and a PReLU according to equation 3 above (represented below).

$$E_i = \mathrm{PReLU}(U_i * E_{i-1}), \tag{3}$$

where * denotes the convolution operator, i=2, 3, . . . , I denotes the convolutional layer index, $U_i \in R^{N \times N \times g}$ denotes N learnable kernels, $E_1$ is the output of the 1-D convolution 304, and $E_i \in R^{N \times K}$ is output of the ith convolutional layer.

A first variant of the exemplary nonlinear deep encoder/decoder increases the temporal context of the deep layers by employing dilated convolutions.

A second variant of the exemplary nonlinear deep encoder/decoder further increases the capacity by using GLUs to replace the PReLUs as the activation function, as noted above. Furthermore, a global layer normalization was inserted before the sigmoid nonlinearity in the GLU to speed up training.

In a first experiment, the performance of the nonlinear deep encoder/decoder and its variants for speech source separation was evaluated on the commonly used WSJ0 2-speaker (WSJ0-2mix) database known to those skilled in the art. The results of the first experiment are summarized in Table 1, below.

TABLE 1

Summary of the studied variants and their performance on the
WSJ0-2mix evaluation set. The objective function is SI-SNR.

| Model | (I) # layers | Non-linearity | # first-layer filters | SI-SNRi (dB) |
|---|---|---|---|---|
| Conv-TasNet | 1 | Linear | 512 | 15.4 |
| Big-Conv-TasNet | 1 | Linear | 1024 | 15.3 |

TABLE 1-continued

Summary of the studied variants and their performance on the
WSJ0-2mix evaluation set. The objective function is SI-SNR.

| Model | (I) # layers | Non-linearity | # first-layer filters | SI-SNRi (dB) |
|---|---|---|---|---|
| Deep with PReLU | 4 | PReLU | 512 | 16.1 |
| Deep with dilation | 5 | PReLU | 512 | 16.0 |
| Deep with GLU | 4 | GLU | 512 | 16.2 |

Training (30 hours) and validation sets (10 hours) were created by randomly mixing utterances from 100 speakers at randomly selected SNRs between −5 and 5 dB. All waveforms were sampled at 8000 Hz. Table 1 summarizes the SI-SNR improvement (SI-SNRi) before and after speech separation on the test set (5 hours, 16 unseen speakers). First, the original Conv-TasNet was successfully reproduced to build upon their result (row 1, Table 1). Second, note that the BigConv-TasNet (row 2, Table 1), a modified Conv-TasNet with double the number of kernel filters and four (instead of three) temporal convolutional networks (TCNs) in the separator, is not able to outperform the original Conv-TasNet. And third, the deep encoder/decoder (row 3, Table 1) provides 0.7 dB improvement over the baseline. This result denotes the importance of the architecture itself because the objective metrics did not improve by simply increasing the capacity of the model. Therefore, it can be seen in Table 1 that the nonlinear deep encoder/decoder and its variants significantly outperform both the original Conv-TasNet, and BigConv-TasNet.

6. HARDWARE IMPLEMENTATION

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 10:
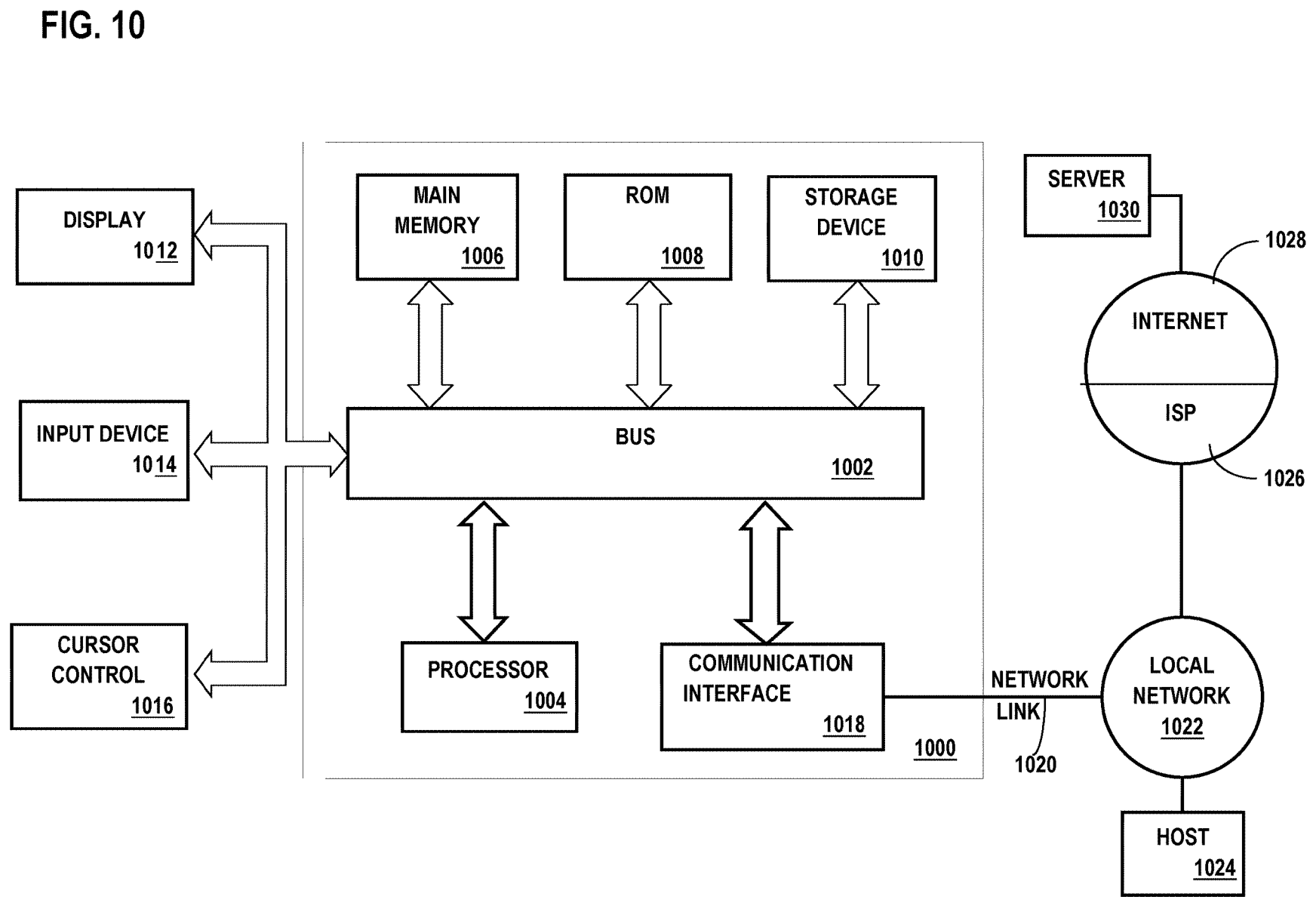

FIG. 10 is a block diagram that illustrates an example computer system with In the example of FIG. 10, a computer system 1000 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 1000 includes an input/output (I/O) subsystem 1002 which may include a bus and/or other communication mechanism(s) for communicating information and/or instructions between the components of the computer system 1000 over electronic signal paths. The I/O subsystem 1002 may include an I/O controller, a memory controller and at least one I/O port. The electronic signal paths are represented schematically in the drawings, for example as lines, unidirectional arrows, or bidirectional arrows.

At least one hardware processor 1004 is coupled to I/O subsystem 1002 for processing information and instructions. Hardware processor 1004 may include, for example, a general-purpose microprocessor or microcontroller and/or a special-purpose microprocessor such as an embedded system or a graphics processing unit (GPU) or a digital signal processor or ARM processor. Processor 1004 may comprise an integrated arithmetic logic unit (ALU) or may be coupled to a separate ALU.

Computer system 1000 includes one or more units of memory 1006, such as a main memory, which is coupled to I/O subsystem 1002 for electronically digitally storing data and instructions to be executed by processor 1004. Memory 1006 may include volatile memory such as various forms of random-access memory (RAM) or other dynamic storage device. Memory 1006 also may be used for storing temporary variables or other intermediate information during execution of instructions to be executed by processor 1004. Such instructions, when stored in non-transitory computer-readable storage media accessible to processor 1004, can render computer system 1000 into a special-purpose machine that is customized to perform the operations specified in the instructions.

Computer system 1000 further includes non-volatile memory such as read only memory (ROM) 1008 or other static storage device coupled to I/O subsystem 1002 for storing information and instructions for processor 1004. The ROM 1008 may include various forms of programmable ROM (PROM) such as erasable PROM (EPROM) or electrically erasable PROM (EEPROM). A unit of persistent storage 1010 may include various forms of non-volatile RAM (NVRAM), such as FLASH memory, or solid-state storage, magnetic disk or optical disk such as CD-ROM or DVD-ROM, and may be coupled to I/O subsystem 1002 for storing information and instructions. Storage 1010 is an example of a non-transitory computer-readable medium that may be used to store instructions and data which when executed by the processor 1004 cause performing computer-implemented methods to execute the techniques herein.

The instructions in memory 1006, ROM 1008 or storage 1010 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 1000 may be coupled via I/O subsystem 1002 to at least one output device 1012. In one embodiment, output device 1012 is a digital computer display. Examples of a display that may be used in various embodiments include a touch screen display or a light-emitting diode (LED) display or a liquid crystal display (LCD) or an e-paper display. Computer system 1000 may include other type(s) of output devices 1012, alternatively or in addition to a display device. Examples of other output devices 1012 include printers, ticket printers, plotters, projectors, sound cards or video cards, speakers, buzzers or piezoelectric devices or other audible devices, lamps or LED or LCD indicators, haptic devices, actuators or servos.

At least one input device 1014 is coupled to I/O subsystem 1002 for communicating signals, data, command selections or gestures to processor 1004. Examples of input devices 1014 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 1016, which may perform cursor control or other automated control functions such as navigation in a graphical interface on a display screen, alternatively or in addition to input functions. Control device 1016 may be a touchpad, a mouse, a trackball, or cursor direction keys for communicating direction information and command selections to processor 1004 and for controlling cursor movement on display 1012. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 1014 may include a combination of multiple different input devices, such as a video camera and a depth sensor.

In another embodiment, computer system 1000 may comprise an internet of things (IoT) device in which one or more of the output device 1012, input device 1014, and control device 1016 are omitted. Or, in such an embodiment, the input device 1014 may comprise one or more cameras, motion detectors, thermometers, microphones, seismic detectors, other sensors or detectors, measurement devices or encoders and the output device 1012 may comprise a special-purpose display such as a single-line LED or LCD display, one or more indicators, a display panel, a meter, a valve, a solenoid, an actuator or a servo.

When computer system 1000 is a mobile computing device, input device 1014 may comprise a global positioning system (GPS) receiver coupled to a GPS module that is capable of triangulating to a plurality of GPS satellites, determining and generating geo-location or position data such as latitude-longitude values for a geophysical location of the computer system 1000. Output device 1012 may include hardware, software, firmware and interfaces for generating position reporting packets, notifications, pulse or heartbeat signals, or other recurring data transmissions that specify a position of the computer system 1000, alone or in combination with other application-specific data, directed toward host 1024 or server 1030.

Computer system 1000 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 1000 in response to processor 1004 executing at least one sequence of at least one instruction contained in main memory 1006. Such instructions may be read into main memory 1006 from another storage medium, such as storage 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 1010. Volatile media includes dynamic memory, such as memory 1006. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 1002. Transmission media can also take the form of acoustic or light waves, such as those generated during radio-wave and infrared data communications.

Various forms of media may be involved in carrying at least one sequence of at least one instruction to processor 1004 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 1000 can receive the data on the communication link and convert the data to be read by computer system 1000. For instance, a receiver such as a radio frequency antenna or an infrared detector can receive the data carried in a wireless or optical signal and appropriate circuitry can provide the data to I/O subsystem 1002 such as place the data on a bus. I/O subsystem 1002 carries the data to memory 1006, from which processor 1004 retrieves and executes the instructions. The instructions received by memory 1006 may optionally be stored on storage 1010 either before or after execution by processor 1004.

Computer system 1000 also includes a communication interface 1018 coupled to bus 1002. Communication interface 1018 provides a two-way data communication coupling to network link(s) 1020 that are directly or indirectly connected to at least one communication networks, such as a network 1022 or a public or private cloud on the Internet. For example, communication interface 1018 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 1022 broadly represents a local area network (LAN), wide-area network (WAN), campus network, internetwork or any combination thereof. Communication interface 1018 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 1018 sends and receives electrical, electromagnetic or optical signals over signal paths that carry digital data streams representing various types of information.

Network link 1020 typically provides electrical, electromagnetic, or optical data communication directly or through at least one network to other data devices, using, for example, satellite, cellular, Wi-Fi, or BLUETOOTH technology. For example, network link 1020 may provide a connection through a network 1022 to a host computer 1024.

Furthermore, network link 1020 may provide a connection through network 1022 or to other computing devices via internetworking devices and/or computers that are operated by an Internet Service Provider (ISP) 1026. ISP 1026 provides data communication services through a world-wide packet data communication network represented as internet 1028. A server computer 1030 may be coupled to internet 1028. Server 1030 broadly represents any computer, data center, virtual machine or virtual computing instance with or without a hypervisor, or computer executing a containerized program system such as DOCKER or KUBERNETES. Server 1030 may represent an electronic digital service that is implemented using more than one computer or instance and that is accessed and used by transmitting web services requests, uniform resource locator (URL) strings with parameters in HTTP payloads, API calls, app services calls, or other service calls. Computer system 1000 and server 1030 may form elements of a distributed computing system that includes other computers, a processing cluster, server farm or other organization of computers that cooperate to perform tasks or execute applications or services. Server 1030 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 1030 may comprise a web application server that hosts a presentation layer, application layer and data storage layer such as a relational database system using structured query language (SQL) or NoSQL, an object store, a graph database, a flat file system or other data storage.

Computer system 1000 can send messages and receive data and instructions, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage 1010, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 1004. While each processor 1004 or core of the processor executes a single task at a time, computer system 1000 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

7. EXTENSIONS AND ALTERNATIVES

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

The invention claimed is:

1. A computer-implemented method of separating audio signals from different speech sources, comprising:

receiving, by a processor, a mixture audio signal comprising audio signals from a plurality of speech sources in a time domain;

transforming, by the processor, the mixture audio signal into an encoded representation by an encoder convolutional neural network (CNN) with multiple convolutional layers and nonlinear activation, wherein the encoder CNN comprises a first stack of convolutional layers, each convolutional layer comprising a respective one-dimensional (1-D) convolution followed by a gated linear unit (GLU) activation, and wherein transforming the mixture audio signal into the encoded representation comprises:

transforming, by the processor, the mixture audio signal in the time domain into an intermediate encoded representation using at least a first convolutional layer, the intermediate encoded representation being represented by N dimensions;

transforming, by the processor, the intermediate encoded representation to the encoded representation using the first stack of convolutional layers including at least three subsequent convolutional layers configured to hierarchically transform the intermediate encoded representation into a non-linear latent space, each of the at least three subsequent convolutional layers implementing a respective 1-D convolutional operation with N learnable kernels and outputting an output representation with N dimensions, wherein an initial convolutional layer of the at least three subsequent convolutional layers extracts a first pattern from the intermediate encoded representation, wherein a final convolutional layer of the at least three subsequent convolutional layers extracts a second pattern from the intermediate encoded representation, the second pattern having a lower resolution than the first pattern, and wherein the output representation of the final layer of said at least three subsequent convolutional layers is the encoded representation; and separating the encoded representation into a plurality of individual representations corresponding to the plurality of speech sources; and transforming the plurality of individual representations into a plurality of audio signals corresponding to the plurality of speech sources by a decoder CNN including multiple convolutional layers and nonlinear activation.

2. The computer-implemented method of claim 1, wherein each of the plurality of audio signals comprises a waveform in a time domain.

3. The computer-implemented method of claim 1, wherein the first convolutional layer has linear activation or no activation.

4. The computer-implemented method of claim 1, wherein the nonlinear activation is selected from the group consisting of a parametric rectified linear unit (PReLU), a gated linear unit (GLU), a GLU with normalization, a leaky ReLU, a Sigmoid function, or a Tan H function.

5. The computer-implemented method of claim 1, wherein the encoder CNN comprises one or more residual and skip connections.

6. The computer-implemented method of claim 1, wherein a structure of the decoder CNN corresponds to a structure of the encoder CNN.

7. The computer-implemented method of claim 1, further comprising:

receiving a plurality of sample audio signals corresponding to the plurality of audio sources; and building the encoder CNN based on the plurality of sample audio signals using an objective function comprising scale-invariant signal-to-noise ratio (SI-SNR) with permutation-invariant training.

8. The computer-implemented method of claim 1, wherein the separating is performed by a separator CNN comprising stacked dilated convolutional blocks.

9. A non-transitory, computer-readable storage medium storing computer-executable instructions that, when executed by one or more processors, cause the one or more processors to perform the method of claim 1.

10. The non-transitory, computer-readable storage medium of claim 9, wherein the method further comprises:

receiving the plurality of individual representations from a separator;

applying the decoder CNN to each individual representation of the plurality of individual representations to generate an audio signal that spans a range of time, the decoder CNN having multiple convolutional layers and nonlinear activation; and transmitting the plurality of audio signals.

11. The non-transitory, computer-readable storage medium of claim 9, wherein the nonlinear activation comprises a PRELU, a GLU, a GLU with normalization, a leaky ReLU, a Sigmoid function, or a Tan H function.

12. The non-transitory, computer-readable storage medium of claim 9, wherein the encoder CNN comprises one or more residual and skip connections.

13. A system for separating audio signals from different sources, comprising:

one or more processors;

a memory storing computer-executable instructions which when executed by the one or more processors causing the one or more processors to perform the method of claim 1.

14. The system of claim 13, wherein the decoder CNN comprises one or more convolutional layers with residual and skip connections.

* * * * *